Dec. 4, 1962
J. E. SCHRINER
3,066,351
METHOD AND APPARATUS FOR MOLDING
Filed Nov. 6, 1959
3 Sheets-Sheet 1
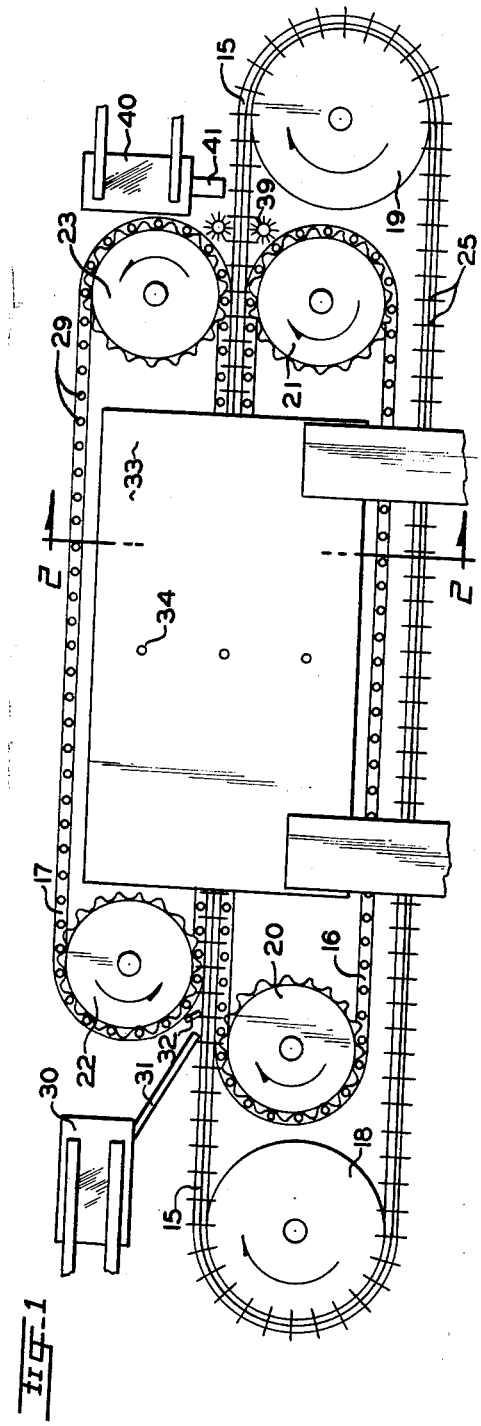
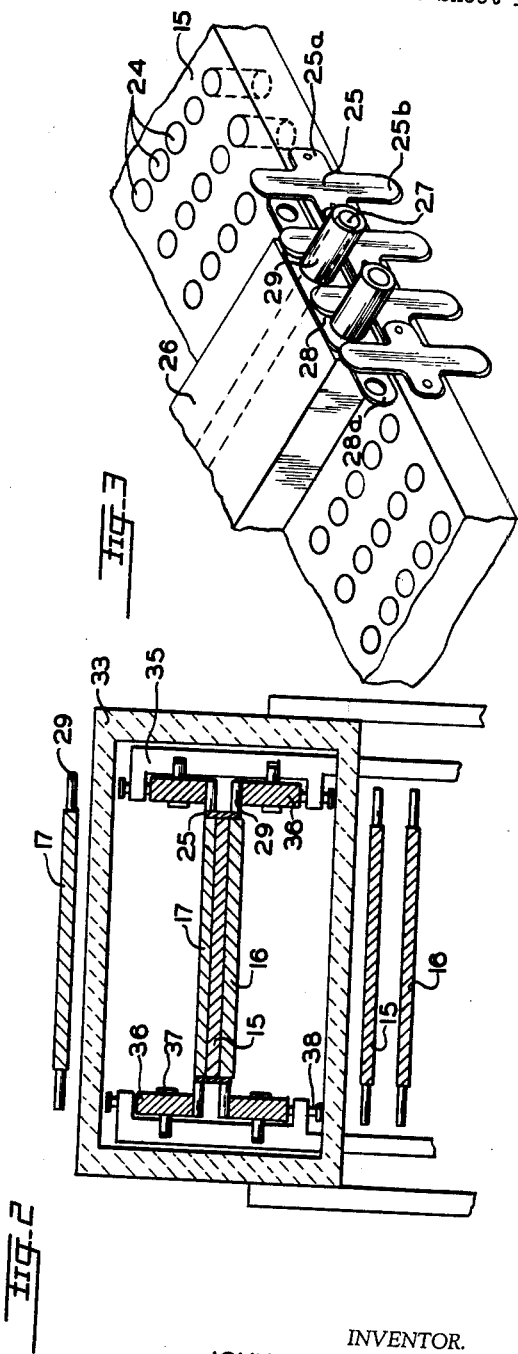
INVENTOR.
JOHN E. SCHRINER
BY
Oberlin, Maky & Donnelly
ATTORNEYS Dec. 4, 1962
J. E. SCHRINER
3,066,351
METHOD AND APPARATUS FOR MOLDING
Filed Nov. 6, 1959
3 Sheets-Sheet 2
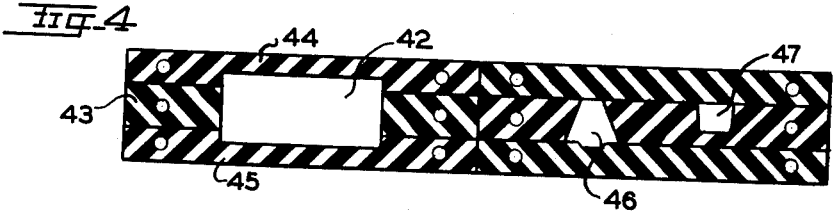
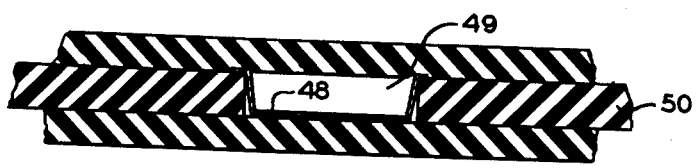
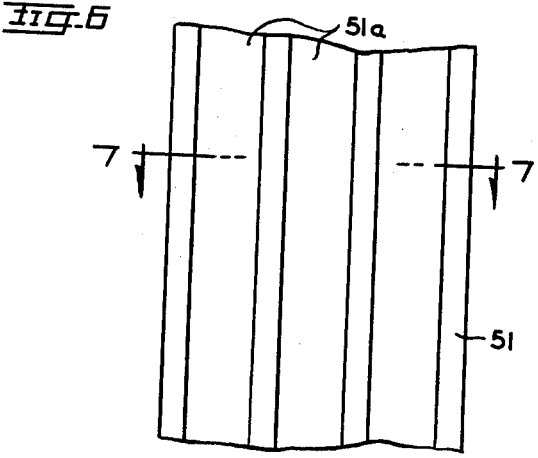
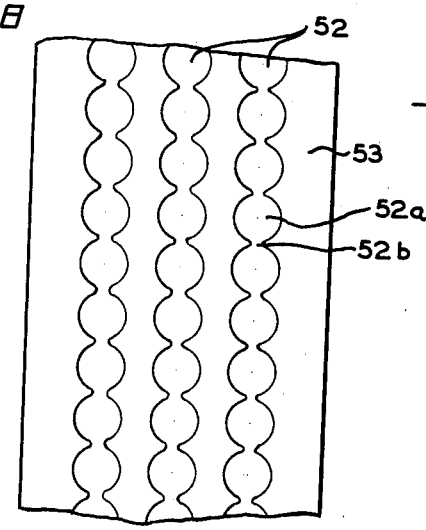
INVENTOR.
JOHN E. SCHRINER
BY
Oberlin, Maky & Donnelly
ATTORNEYS Dec. 4, 1962
J. E. SCHRINER
3,066,351
METHOD AND APPARATUS FOR MOLDING
Filed Nov. 6, 1959
3 Sheets-Sheet 3
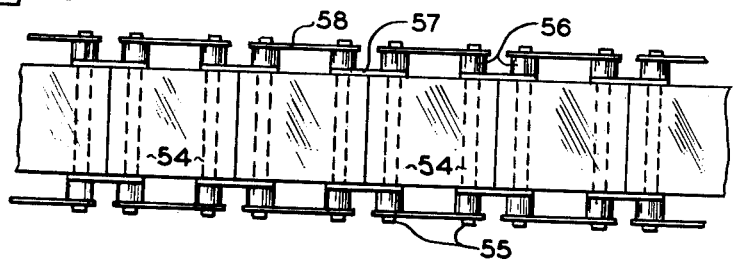
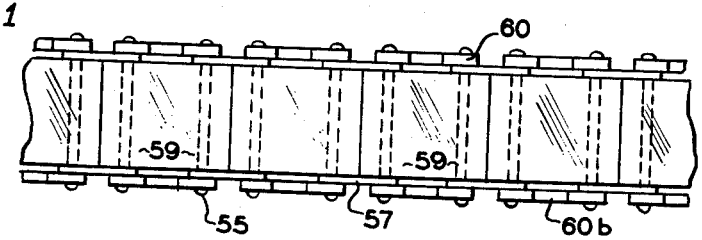
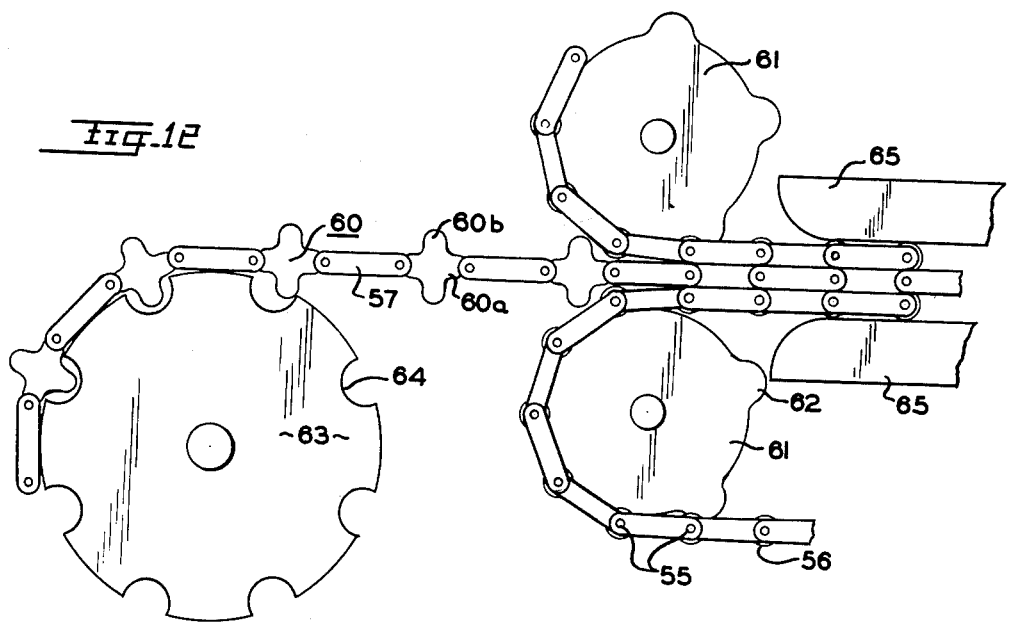
INVENTOR.
JOHN E. SCHRINER
BY
Oberlin, Maky & Donnelly
ATTORNEYS

United States Patent Office 3,066,351
Patented Dec. 4, 1962

3,066,351
METHOD AND APPARATUS FOR MOLDING
John E. Schriner, Willoughby, Ohio, assignor to The Eagle-Picher Company, Cincinnati, Ohio, a corporation of Ohio
Filed Nov. 6, 1959, Ser. No. 851,360
9 Claims. (Cl. 18—4)

The present invention relates to a method and apparatus for molding and, more particularly, to a continuous method and apparatus for molding articles, especially of relatively small size, which acquire accurate mold dimensions and are free of blow-holes, porosity, and the like.

One problem met in molding, particularly when relatively small articles such as heel lifts or top lifts for ladies' shoes are to be molded, is the provision of a sufficiently fast production which does not sacrifice accurate and faithful mold reproductions. For example, if a molding process is operated too quickly, the mold may not be completely filled, leaving undersized molded articles or voids in such articles. Often the proper release of air from a mold or like cavity also interferes with the realization of a satisfactory reproduction of the mold configuration. When the air is not properly removed, the utilimately molded article is apt to contain blow-holes or to be porous. Particularly when the moldable material employed is a reaction product from other ingredients and simultaneously forms an effluent gas, this problem is further accentuated since the gas obviously must be suitably vented away in some manner without interfering with the molding operation. An example of a material which is subject to the foregoing molding difficulties is polyurethane.

It is, therefore, a principal object of the present invention to provide an improved method and apparatus for molding.

Another object is to provide a continuous method and apparatus for molding relatively small articles and at a relatively fast rate.

A further object is to provide a method and apparatus for molding in which gases are bled from the mold cavity without interfering with the molding process.

A still further object is to provide a method and apparatus for molding which provides for complete filling of the mold cavity such that accurate reproduction of the mold configuration is realized.

A still further object is to provide an improved continuous method and apparatus for molding polyurethane.

Other objects of the invention will become apparent as the description proceeds.

To the accomplishment of the foregoing and related ends, the invention consists of the features hereinafter fully described and particularly pointed out in the claims, the annexed drawing and following disclosure describing in detail the invention, such drawing and disclosure illustrating, however, but one or more of the various ways in which the invention may be practiced.

In the annexed drawing:

FIGURE 1 is a side elevational view of one form of the apparatus that may be used in practicing the present invention;

FIGURE 2 is a section of FIGURE 1 on the line 2—2;

FIGURE 3 is a perspective, fragmentary view of a belt, used in the apparatus of FIGURES 1 and 2 to receive moldable material, and a section of an overlying or superposed belt;

FIGURE 4 is a longitudinal section of the superposed belts of conveyors of FIGURE 1 and illustrates modifications of the mold cavities that may be used;

FIGURE 5 is a longtiudinal section smiliar to FIGURE 4 and shows an insert for a cavity;

FIGURE 6 is a plane view of a belt or conveyor having a longitudinally extending cavity defining a channel;

FIGURE 7 is a section of FIGURE 6 on the line 7—7;

FIGURE 8 is a plan view of a belt or conveyor similar to FIGURE 6 and illustrates another type of cavity that may be employed;

FIGURE 9 is a cross-section of a belt or conveyor similar to FIGURE 7 and shows still another type of longitudinally extending cavity that defines a channel;

FIGURE 10 is a plan view of a modified belt or conveyor which may form the top and/or bottom belt of the assembled three belts illustrated in FIGURE 1;

FIGURE 11 is a plan view of another modified belt or conveyor adapted for use with a belt of FIGURE 10; and FIGURE 12 is a fragmentary, semi-diagrammatic view of apparatus illustrating how the belts of FIGURES 10 and 11 interlock with each other.

In accordance with the present invention, moldable material is deposited within a cavity of a receiving member after which a second member is superposed over the first. The two members are then pressed together completely to fill the cavity with the moldable material. The latter may then, if necessary, be heated or cooled depending upon the nature of the material to convert it to a hardened state. The members are then removed from their superposed relation, and the resulting molded article removed from the receiving member.

Preferably, the members are in the form of belts or conveyors, the receiving member or belt having a plurality of cavities. This belt also is compressible so that it can be compacted by forcing the belts together. This reduces the effective thickness of the compressible belt and completely fills its cavities with the moldable material. In order to realize a continuous molding operation, the superposed belts are moved together, usually in locked registered relation, while successive corresponding portions of the belts are pressed together to compact the compressible belt as described. Although secured against relative longitudinal movement, and preferably also relative transversal movement, the belts permit the escape of gases from the cavities and/or the material being molded in a direction between the superposed belts and thus to the atmosphere. Consequently, blow-holes are prevented and faithful mold reproduction is realized.

Structure

Referring to FIGURES 1, 2 and 3, one embodiment of the apparatus includes a compressible belt or conveyor 15 and companion belts or conveyors 16 and 17. Belt 15 is trained about sprockets 18 and 19; belt 16 is trained about sprockets 20 and 21 and literally ensconced within the path of travel of belt 15 so as to abut the upper length of belt 16 against the bottom of the upper length of belt 15; and belt 17 is trained about sprockets 22 and 23 so as to abut its lower length against the top of the upper length of belt 15. Preferably sprockets 19, 21, and 23 are driven by standard means and at a rate to provide uniform linear travel of the belts, although additional means are preferably used as hereinafter described, to lock the belts against relative longitudinal movement.

Belt 15 (FIGURE 3) has cavities 24, which extend entirely through the belt, to present a perforated appearance, when the three described belts 15, 16 and 17 are used together. However, it is possible to use only two belts such as belts 15 and 17. In this instance the cavities 24 terminate before reaching the remote face of belt 15 and therefore do not completely extend therethrough. In any event, belt 15 has interlocking finger means which, as illustrated in FIGURE 3, may take the form of generally cruciform members 25 whose laterally extending portions 25a partially overlap and are jointly riveted to an edge of belt 15, and whose upstanding finger portions 25b project above and below the belt 15. Such members 25 are preferably secured to both edges of belt 15.

Belts 16 and 17 may be similar in construction, and while they may be of one continuous length, the belts are preferably composed of particulate or segmented sections 26. Each section has a pair of rods 27 which extend transversely of the belt and through each section to project outwardly as shown. A plate 28 has apertures to fit over the rods 27 and is held in place by needle bearings 29 which are, in turn, held in place as by upsetting the ends of the rods 27 without interfering with the freedom of the bearings 29 to turn on the rods 27. The plate 28 has apertured end portions 28a which extend longitudinally of the belt to adjacent sections, similar to section 26, and fit about rods 27 of that section, so as in this manner to lock the sections 26 together and thus define the belt 16 or 17. The finger portions 25b and the bearings 29 interleave as shown in FIGURE 3 to lock the belts against relative longitudinal movement.

A reservoir or mixing unit 30, suitably supported above belt 15, releases moldable material onto such belt through a delivery nozzle 31. A doctor knife 32 may be used if needed to work the moldable material into the cavities 24.

Although most moldable material will set in time without artificial aid, it is desirable from the standpoint of time to hasten this step. Accordingly, an open ended housing 33, preferably of refractory material, encloses the superposed belts for part of their joint travel. Hot air or combustible gas is fed to the interior of the housing 33 through tubes 34 if heat is required, or the same tubes can conduct cold refrigerated air if cooling is desired. Adjacent each end of the housing 33 and on each side of the train of belts, a fixed support frame 35 is located. The frames on a common side of the belts carry a pair of compression beams or runners 36 which extend substantially the length of the housing 33 and are held in place by lock bolts 37 and adjusting bolts 38.

At the discharge end of the apparatus, rotary brushes 39 may be used to clean the surfaces of the belt 15. An ejector 40 has a series of pistons 41 which are spaced to match the cavities 24 and are periodically operated by known means to force the hardened molten articles from such cavities and into a suitable receptacle, not shown.

Referring to the modifications of FIGURES 4 through 9, FIGURE 4 shows a longitudinal cross-section of three superposed belts, each of which is composed of joined sections as illustrated also in FIGURES 10 and 11. The lefthand portion of FIGURE 4 shows that a molding cavity 42 need not be restricted to a center belt 43 but can extend as well into one or both of the overlying and underlying belts 44 and 45, respectively. The righthand portion of FIGURE 4 illustrates that the cavity can take varying shapes. Also, it will be noted that the cavity 46 flares or diverges in a downward direction, and this facilitates the action of the plunger pistons 41 of the ejector 40. Since cavity 47 does not extend through the center belt 43, an ejector like that shown at 40 cannot be used in this instance. Instead a molded article in a cavity like that at 47 is ejected from the belt 43 after belt 44 is removed and belt 43 flexes in passing about sprocket 19. This action is facilitated if the cavity 47 diverges in an upward direction as shown.

In order to provide a mold of possibly more intricate configuration and/or to prevent adherence or sticking between a molded article and a mold cavity, an insert 48 having the desired configuration may be carried in a cavity 49 of a center belt 50 as shown in FIGURE 5. The insert 48 can be made of metal, such as from pressed aluminum, or the insert can be made from plastic having a conventional mold release coating.

Instead of small segregated cavities such as those illustrated at 24, the cavities can extend longitudinally of the belt to define a channel mold in the manner depicted by FIGURES 6, 7, and 9. The product of FIGURES 6 and 7 is a bar or slab, while that of FIGURE 9 is a bar having a longitudinal central groove. In these modifications, channel cavities 51a do not extend through a belt 51 as discussed previously in connection with a possible modification of belt 15 in FIGURE 3.

In FIGURE 8, the cavities 52 may or may not extend entirely through a belt 53. This configuration is used to mold a plurality of small articles, as in the circular shape 52a, while still retaining a small web connection 52b between the articles to form a continuous strip. Later, the strip may be cut at each of the web portions 52b to produce the individual small articles molded in each of the cavities 52a.

FIGURES 10 to 12 show a modified form which the belts or conveyors may assume. FIGURE 10 illustrates an upper or upper and lower belt construction which includes a plurality of sections 54 that may comprise, for example, hard rubber or even metal. Each section has a pair of transversely extending rods 55. A roller bearing 56 on each rod rides between a connecting link 57 and a plate 58. The links 57 have apertures to receive the rods 55 and thereby connect adjacent sections 54. The plates 58 connect the adjacent ends of the rods 55 which are common to a single section 54. The rods 55 are upset at their outer ends to maintain the described parts in assembly.

FIGURE 11 illustrates a belt construction for use in connection with a belt such as that shown in FIGURE 10. For purposes of illustration, the cavities of the belt of FIGURE 11 have not been indicated. This belt construction is similar to that of FIGURE 10 except that instead of rollers 56 and plates 58, the sections 59 carry on opposite sides an "x" or cruciform member 60. Two opposing arms 60a (FIGURE 12) of each member 60 are secured between links 57, while the remaining opposing arms 60b project above and below the sections 59.

In practice, sections 54 are trained around coaxial sprockets 61 (of which only one sprocket of each pair is shown in FIGURE 12) which have radial hub portions 62 that fit between a section 54 and a plate 58. Sections 59 of the belt of FIGURE 11 are trained about coaxial sprockets 63 (of which only one sprocket is shown in FIGURE 12) which have peripheral sockets 64 to receive the arms 60b of the members 60. When three of such belts interengage as shown in FIGURE 12, the arms 60b of the members 60 fit between rollers 56, plate 58, and the adjacent section 54. When the belts superposed as described pass between compression beams 65, the latter bear against the rollers 56.

*Operation*

The mixing unit 30 discharges by any convenient means through nozzle 32 moldable material onto belt 15 or a belt composed of the sections 59 as illustrated by FIGURE 11. Such moldable material may comprise either thermoplastic materials or heat-settable or thermosetting materials. Moreover, such materials may be either naturally occurring or of synthetic origin. For example, thermoplastic moldable materials may be used, such as methyl acrylate, methyl methacrylate, cellulose acetate, cellulose acetate butyrate, cellulose nitrate, the polyamides (nylon), polyethylene, polypropylene, polystyrene, the vinyl polymers and copolymers such as polyvinyl acetate, polyvinyl butyral, polyvinyl chloride, and polyvinylidene. Heat-settable moldable materials include diallyl phthalate, epoxy resins, urea-formaldehydes, melamine-formaldehydes, phenol-formaldehydes, phenol-furfurals, thermosetting polyesters, and the like.

Most satisfactory results have been obtained with a polyurethane type of thermosetting compound. Since these polymers are known in the art, they are not herein described in detail. Ordinarily, a polyurethane is obtained by reacting an isocyanate, usually a diisocyanate, with a compound furnishing free hydrogen atoms. For identification purposes, a compound that contains a free or labile hydrogen atom is one that will give a positive Zerewitinoff test, that is, any compound which, when added to a Grignard solution of methyl iodide, liberates methane by decomposition of the Grignard reagent. Thus, the isocyanate may be reacted with glycols, polyesters, polyethers, polyols, polyamides, phenols, hydroxyl and carboxylic acid groups, and the like.

In this respect it is emphasized that the diisocyanate and the hydrogen-containing compound can be mixed directly in the unit 30 and subsequently interreacted directly on the belt 15 itself or within the cavities 24. In any event, I have found it necessary to make the belt 15 or the sections 59 of FIGURE 11 from silicone rubber when processing a polyurethane. Otherwise the polyurethane adheres to the belt and separation therefrom of the molded articles is not easily accomplished. Silicone rubber appears to have a self-lubricating effect such that molded polyurethane articles are easily released therefrom. Belts 16 and 17 or the belt of FIGURE 10 may also be composed of silicone rubber when processing polyurethane but need not be. Obviously, the materials used for the belts must resist the temperature of the particular material being molded. Other materials which can be used for the belt include neoprene, chloroprene, butadiene-acrylonitrile copolymer, butadiene-styrene copolymer, and the like.

The doctor knife 32 forces the moldable material into the cavities 24. However, it is not essential that the doctor knife be used. Knowing the total volume of the cavities in a given unit length of belt 15, the proper amount of material can be advanced from the reservoir 30 at a necessary rate such that the action of the belts 15, 16 and 17 in assuming the described superposed relation forces a requisite amount of material into each cavity. As the upper and lower belts 17 and 16, respectively, join the central belt 15, each of the belts is locked against relative longitudinal and transversal movement with respect to the others by means of the interlocking arrangement shown in FIGURE 3 or by that illustrated in FIGURES 10 to 12. Continued joint travel of the assembled belts forces the bearings 29 or rollers 56 between the compression beams 36 or 65. The beams thus serve as tracks or runners which force or compact the assembled belts together.

In accordance with the present apparatus and method, the belt containing the cavities is compressed during the described compaction. It is necessary only that such belt be more compressible than the moldable material. Since the latter being in the form of a liquid or hot melt is virtually incompressible, the compressibility of such belt need not be great. The upper belt and also the lower belt, where used, such as the belts 16 and 17 of FIGURE 1, may also be compressible (particularly in the embodiment of FIGURE 4 where they aid in defining part of the volume of the cavity), but this is not necessary to realizing the advantages of the invention. The objective of the compression is to form a mold cavity of predetermined volume and shape, which is smaller than that obtained during no compression, such that there is at least sufficient moldable material present completely to fill the cavity. Any excess material which may be thus formed appears as a thin flashing extending from the cavity and between the belts.

Although the belts are locked against relative longitudinal movement, and preferably also against relative transversal movement, and then compressed together along their edges, the belts are still free to separate or rise the very slight amount needed to vent or bleed between the belts any gas forced from the cavities by the molding operation. This is particularly important when an effluent gas is released as may be the case where the moldable material is a reaction product formed directly in the cavities from two or more reactants. Also, as the belts move through the housing 33 and between the compression beams 36 or 65, it will be realized that successive, corresponding superposed portions of the belts are treated as described, so that there is a squeegee-like action serving to force the expelled gases always laterally of such portions. As a result, there are no blow-holes in the molded articles, and a faithful reproduction of the size and configuration of the mold cavity can be achieved.

After the material has set and belts 16 and 17 are peeled away by their respective sprockets 21 and 23, the hardened molded articles may be recovered from belt 15 by the described ejector 40 and the synchronized piston rams 41 or by still other means.

Other forms embodying the features of the invention may be employed, change being made as regards the features herein disclosed, provided those stated by any of the following claims or the equivalent of such features be employed.

I therefore particularly point out and distinctly claim as my invention:

1. A method of continuous molding comprising depositing a moldable material within a cavity of a compressible belt in an amount substantially but not completely to fill such cavity, superposing a second belt on the first, moving the belts concurrently while in such superposed relation, continuously pressing corresponding and successive lengths of such belts together to reduce the thickness of such lengths of the compressible belt sufficiently to fill such cavity of resulting reduced volume with the moldable material, simultaneously bleeding any gas displaced from the cavity between the superposed belts by means of such continuous pressing of corresponding and successive lengths of the belts, and then converting the material to a hardened state while the compressible belt is so reduced in thickness.

2. The method of claim 1 wherein such moldable material is a heat-settable material, and such step of converting the moldable material to a hardened state comprises heating such material.

3. The method of claim 1 wherein such moldable material is a flowable thermoplastic material, and such step of converting the moldable material to a hardened state comprises cooling the material.

4. A method of continuously molding the reaction product of at least two reactants comprising depositing such reactants within a plurality of cavities of a compressible belt in an amount substantially but not completely to fill such cavities, superposing a second belt on the first belt, moving the belts together while in such superposed relation, pressing corresponding and successive lengths of the belts together to provide a squeegee action directed longitudinally of the belts while sufficiently compacting the compressible belt completely to fill such cavities of resulting reduced volume with such reactants, simultaneously reacting the reactants to form such product, bleeding away any gas displaced from the cavities and any effluent gas formed by the reaction between the contacting surfaces of the superposed belts by such squeegee action, and converting the reaction product to a hardened state while the compressible belt is so compacted accurately to impart to such product a faithful reproduction of the size and configuration of such cavities.

5. Apparatus for continuous molding including a first endless compressible conveyor belt having a plurality of cavities in which to receive a charge of moldable material, a second endless conveyor belt positioned adjacent the first belt to superpose a length thereof on said compressible belt and over such cavities, bearing means spaced along the sides of both belts and extending laterally therefrom, means to move the superposed belts in unison in the direction of their lengths, compression means stationary with respect to the belts and stationed to engage successively said bearing means as the belts pass said compression means and sufficiently compress together corresponding and succeeding lengths thereof substantially to reduce the thickness of the compressible belt, thereby to reduce the volume of such cavities within the successive belt lengths being compressed, the superposed belts being free to vent therebetween toward the non-compressed lengths any gas displaced from the cavities, and means to convert the moldable material to a hardened state while the compressible belt is so reduced in thickness.

6. Apparatus for continuous molding including an endless compressible perforate belt adapted to receive a charge of moldable material in the perforations thereof, a pair of imperforate endless belts mounted one above and one below a length of the compressible belt to provide lengths of all three belts in superposed relation each of said imperforate belts having a plurality of bearing members spaced along the belts and extending transversely through the belts to project laterally therefrom a pair of wheel members for each belt arranged to place contiguous lengths thereof in such superposed relation, means to rotate a wheel member of each pair to move the superposed lengths concurrently in unison in the direction of their lengths, compression beams stationed between the wheel members of each pair and on each side of said belts substantially parallel to the superposed lengths to engage successively said bearing members of the imperforate belts to force together sequentially corresponding and successive portions of such superposed lengths to reduce the thickness of the compressible belt and thereby also the volume of such perforations while simultaneously providing a squeegee action lengthwise of the belts to vent laterally thereof and between the belts any gas displaced from the perforations, and means operative to set the material to a hardened state within such perforations while the length of the compressible belt containing such perforations is so reduced in thickness.

7. The method of claim 4 wherein such two reactants comprise a polyisocyanate and a compound furnishing free hydrogen atoms to form a polyurethane as such product, and wherein converting the reaction product to a hardened state comprises heating such reactants.

8. The method of claim 7 wherein such first belt having a plurality of cavities is composed of silicone rubber to prevent adhesion of the polyurethane to such belt.

9. A continuous method of molding comprising placing a compressible perforate belt on an imperforate belt, depositing moldable material on the perforate belt, spreading the material into the perforations of such belt in an amount substantially but not completely to fill such perforations, superposing a second imperforate belt on the exposed face of the perforate belt, securing the three belts together to prevent relative longitudinal movement therebetween, moving the three belts in unison in the direction of their lengths, continuously compressing successive superposed lengths of such belts together substantially normally of such direction in a squeegee action sufficiently to reduce the thickness of the perforate belt and completely fill the resulting perforations of reduced volume with the moldable material simultaneously venting any gas displaced from the perforations laterally between the contiguous surfaces of the superposed belts by such squeegee action, converting such moldable material to a hardened form while the perforate belt is so erduced in thickness accurately to impart to such material a faithful reproduction of the size and configuration of such cavities, removing at least one of the imperforate belts from such superposed relation, and recovering the resulting molded articles from such perforations.

References Cited in the file of this patent

UNITED STATES PATENTS

| | | |
|---|---|---|
| 1,562,519 | Ruppel | Nov. 24, 1925 |
| 1,751,430 | Thompson | Mar. 18, 1930 |
| 1,905,663 | Wallace | Apr. 25, 1933 |
| 2,016,860 | Hasche | Oct. 8, 1935 |
| 2,059,620 | Harshberger | Nov. 3, 1936 |
| 2,109,190 | Coffeey | Feb. 22, 1938 |
| 2,172,243 | Goodnow et al. | Sept. 5, 1939 |
| 2,281,860 | Renault | May 5, 1942 |
| 2,292,366 | De Wyke | Aug. 11, 1942 |
| 2,365,804 | Clerke | Dec. 26, 1944 |
| 2,533,335 | Wallace | Dec. 12, 1950 |
| 2,691,801 | Robb | Oct. 19, 1954 |
| 2,708,288 | Fulber et al. | May 17, 1955 |
| 2,782,461 | Esslinger | Feb. 26, 1957 |
| 2,817,875 | Harris et al. | Dec. 31, 1957 |

FOREIGN PATENTS

| | | |
|---|---|---|
| 557,465 | Canada | May 13, 1958 |
| 858,834 | France | Dec. 4, 1940 |
| 1,152,849 | France | Feb. 26, 1958 |